United States Patent [19]
Cobb

[11] 4,042,904
[45] Aug. 16, 1977

[54] HYDROWAYS

[75] Inventor: A. Donn Cobb, New London, Conn.

[73] Assignee: The United States of America as represented by the Secretary of the Navy, Washington, D.C.

[21] Appl. No.: 719,493

[22] Filed: Sept. 1, 1976

[51] Int. Cl.$^2$ ................................................. G01S 5/18
[52] U.S. Cl. ..................................... 340/6 R; 30/3 A
[58] Field of Search ............... 340/3 A, 3 E, 5 R, 6 R

[56] References Cited
U.S. PATENT DOCUMENTS

| | | | |
|---|---|---|---|
| 2,515,472 | 7/1950 | Rich | 340/5 R |
| 3,270,345 | 8/1966 | Schauffler | 340/6 R X |
| 3,723,957 | 3/1973 | Damon | 340/6 R X |

*Primary Examiner*—Richard A. Farley
*Attorney, Agent, or Firm*—Richard S. Sciascia; Arthur A. McGill; Prithvi C. Lall

[57] ABSTRACT

An acoustic navigation system for marking channels is utilized for providing safe entry and exit from harbors. The system has a plurality of pairs of acoustic projectors aligned on opposite sides of a channel. Each pair is spaced from corresponding pairs, a predetermined distance along the sides of the channel. A first projector in each pair provides an acoustic source for a period of time. The other projector in the pair provides acoustic sources spaced at predetermined intervals both before and after the signal from the first projector. A vessel equipped with receiving and display equipment determines its own location within the channel from the received acoustic signals.

6 Claims, 8 Drawing Figures

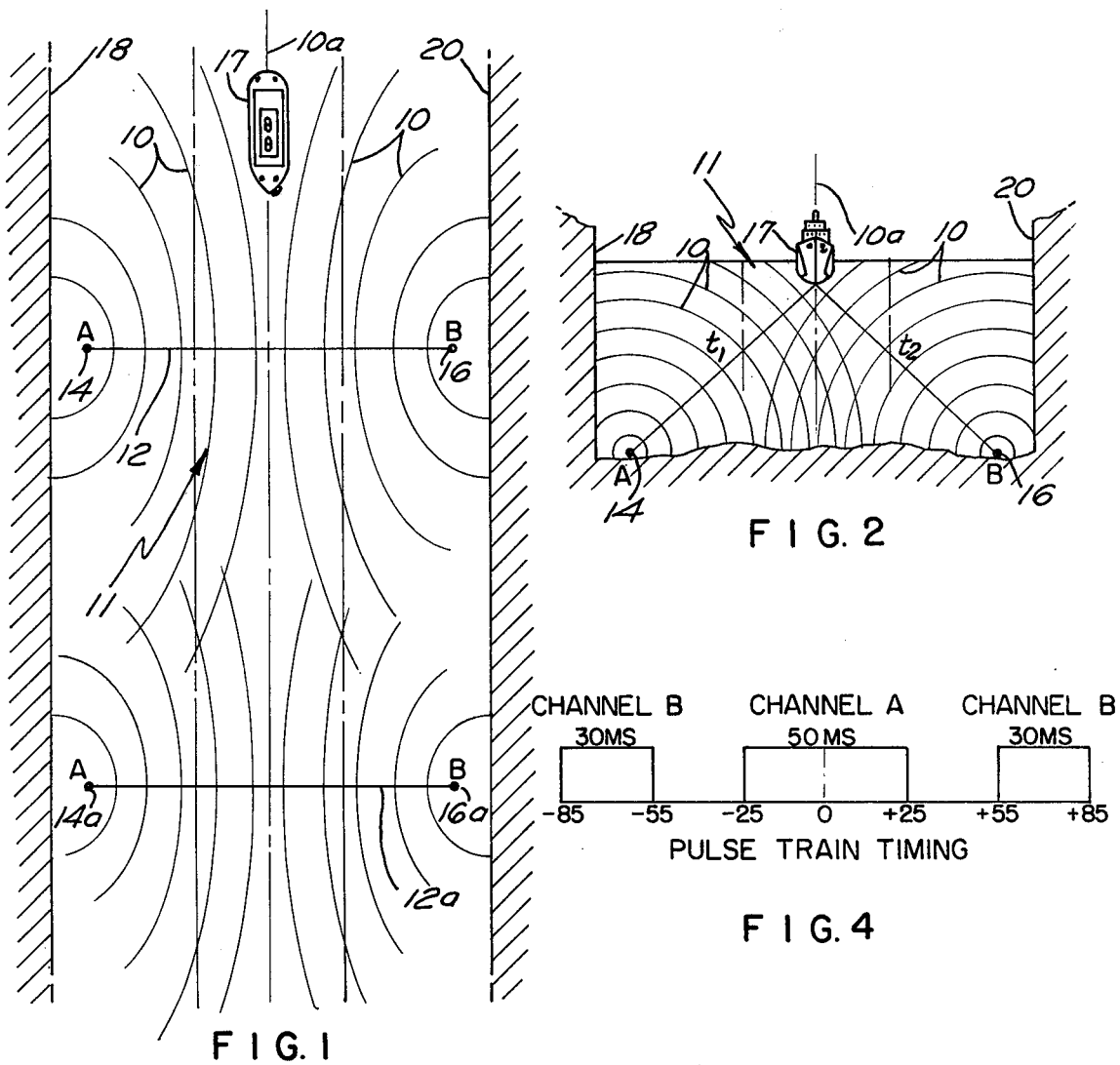
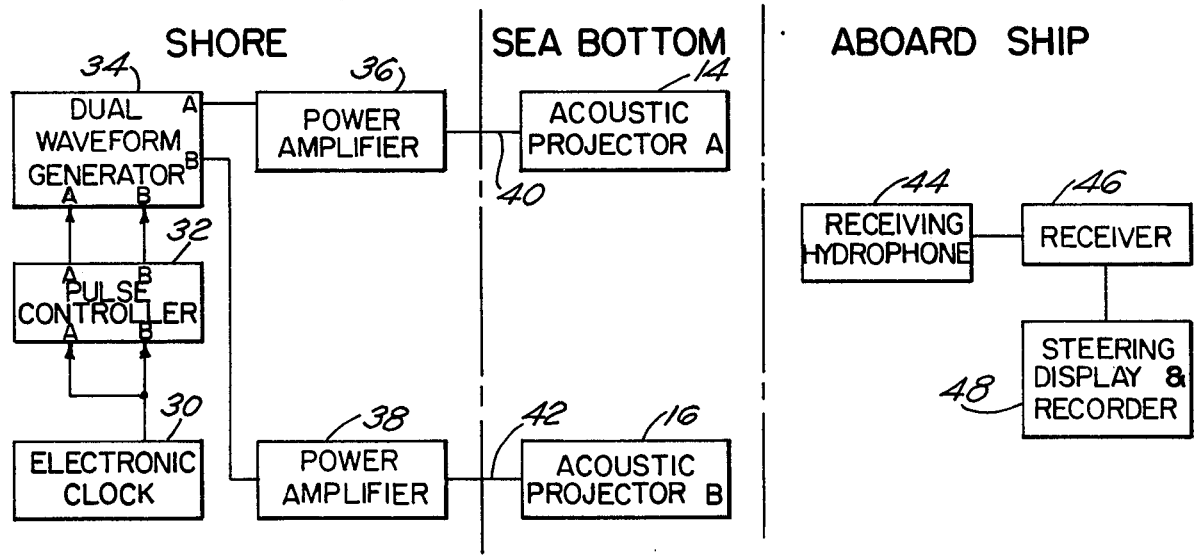

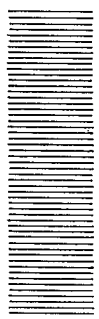
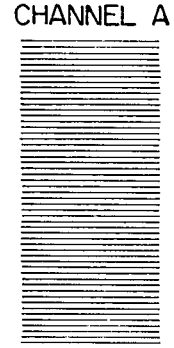
PULSE CONDUCTION
FIG. 5
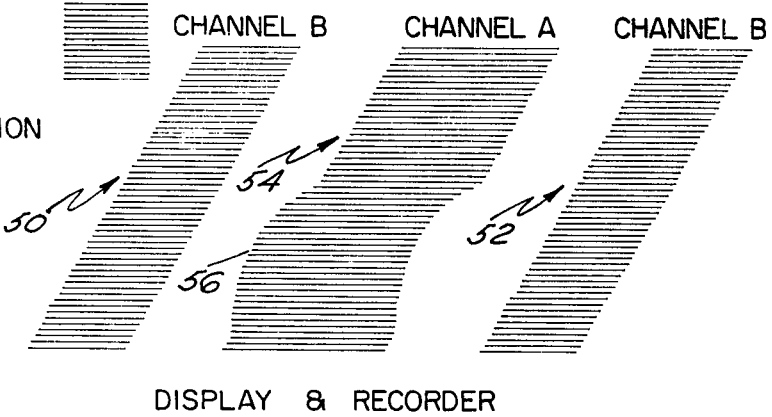
DISPLAY & RECORDER
FIG. 6
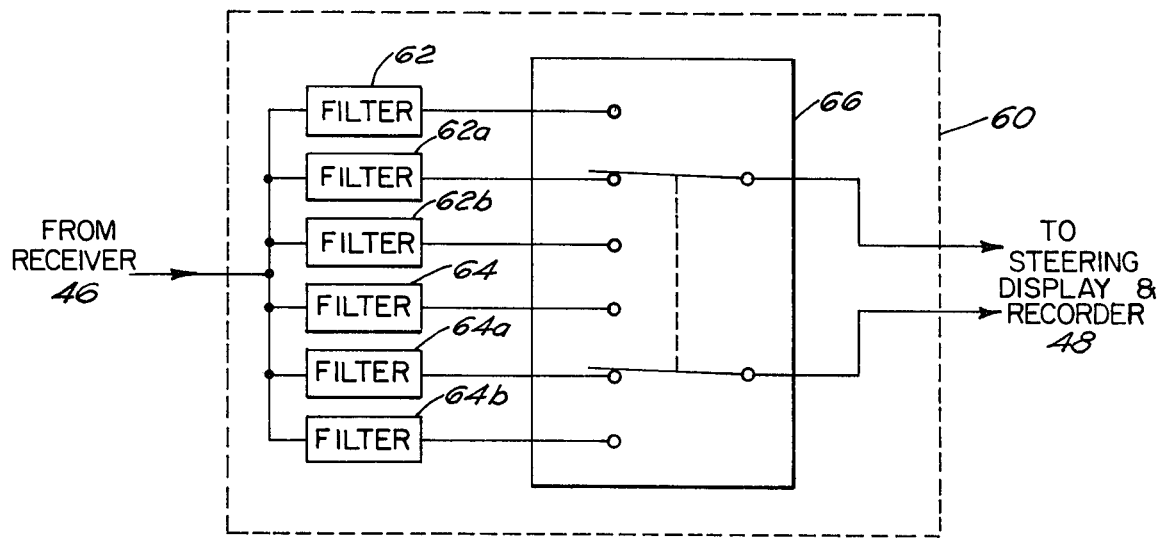
FIG. 8

HYDROWAYS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention generally relates to ship navigation systems and more particularly to an acoustic system for determining the location of one's vessel within a channel on continental margins or within a harbor.

For the most part prior art devices have been buoys or lights within harbors and channels. Inclement weather raises obvious problems when one depends on such devices. On continental margins within the open sea electronic systems and celestial navigation have been utilized. Both of these require calculations not automatically provided from the sensing equipment. In addition celestial navigation also suffers from the problem of inclement weather. Other systems that provide electronic and acoustic signalling from fixed sources exterior to the vessel lack dependability and generally have undue complexity and cost in order to obtain the solution of the problem.

SUMMARY OF THE INVENTION

Accordingly, it is a general purpose and object of the present invention to provide an improved system for determining a ship's position within a channel. It is a further object that the system be operable in inclement weather. Further objects are that the system be dependable, durable, inexpensive, and easy to operate. These and other objects of the invention and the various features and details of construction and operation will become apparent from the specification and drawings.

These are accomplished in accordance with the present invention by providing a system in which timed signals from known locations on opposite sides of a channel are received and processed. A ship's position is then determined so that it can be guided in safe channel between the source of the signals. Corrective measures are manually made when a ship gets closer to either of the sides of the channel as indicated on a display.

BRIEF DESCRIPTION OF THE DRAWINGS

FIG. 1 is a pictorial view of a vessel utilizing the present invention;

FIG. 2 is a second view of the configuration of FIG. 1;

FIG. 3 is a block diagram of the invention;

FIG. 4 is a plot of the significant part of a single pulse received by the dual wave generator of FIG. 3;

FIG. 5 is a plot of a multitude of pulses received by the dual wave generator of FIG. 3;

FIG. 6 represents a typical display by the steering recorder and display of FIG. 3;

FIG. 8 shows a more detailed embodiment of the network of FIG. 7.

DESCRIPTION OF PREFERRED EMBODIMENTS

Figure 7:
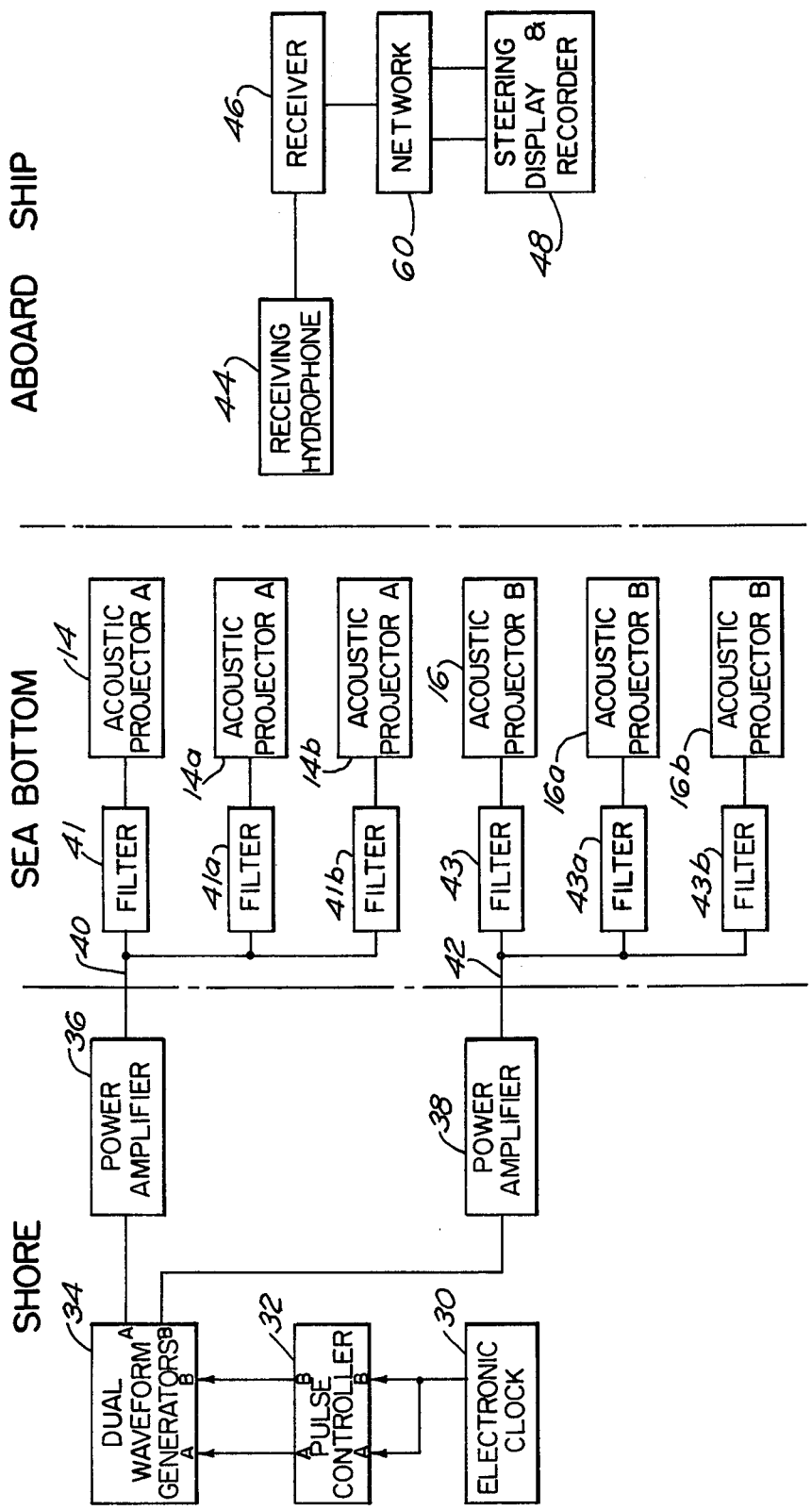
FIG. 7 is a block diagram of the invention utilizing a multiple pair of projectors.

In Loran and other range hyberbolic navigation systems that determine position from the precise measurement of the time difference of arrivals of signals transmitted synchronously from two or more different fixed locations, the lines of position obtained from the measurement of any signal pair are hyperbolae generated about the source locations as foci. FIG. 1 shows the existence of a family of hyperbolic curves 10 within a defined channel 11. One special case that is important to this system design is the straight line 10a defined as the locus of all points where the acoustic travel time difference is zero. This line 10a, the conjugate axis of the hyperbola, is the exact perpendicular bisector of the line 12 connecting the centers of the signal sources 14 and 16. The conjugate axis is a plane in three dimensional space. A ship 17 is shown following this conjugate axis 10a.

The channel 11 can be easily marked between side 18 and 20 by placing acoustic projectors in pairs to provide sound sources at intervals near the channel sides 18 and 20 such as 14 and 16, 14a and 16a, etc.

FIG. 2 is another view of the arrangement of FIG. 1 with the ship 17 shown traveling the conjugate axis. In such a case t1, the travel time of a signal from source 14 to the ship 17, is equal to t2, the travel time of a signal from the source 16 to the ship 17. This zero time differential defines the hydroway.

The Hydroway System is shown in FIG. 3 and utilizes all state-of-the-art components. Clock 30 is a precision time standard that generates 1000 pulses per second to a pulse controller 32. The pulse controller 32 is made up of two separate channels A and B, that each receive the signals from clock 30. Channels A and B each count the pulse train. Channel B starts conducting a single pulse to dual waveform generator 34 after receiving 915 pulses and inhibits conduction following the 945th pulse. Channel B resets its count to 000 on the 1000th pulse and starts conducting a single pulse following the 055th pulse and inhibits conduction following the 085th pulse. Channel A starts conducting a single pulse following the 975th count and inhibits conduction following the 025th count after resetting to 000 on the 1000th count. A plot of the conduction to waveform generator 34 for the significant part of a single pulse train of 1000 counts from clock 30 is shown in FIG. 4, beginning with the first conduction of channel B. A plot of a multitude of pulse trains conducted to waveform generator 34 is shown in FIG. 5. It is to be noted that in time sequence there is a lull of 30 milliseconds both before and after the transmission of pulses from channel A in which time neither channel A nor channel B transmits. More specifically channel B ends a first pulse 30 milliseconds before the start of transmission from channel A and channel B starts a second pulse 30 milliseconds after the end of transmission of channel A.

Referring again to FIG. 3 the dual waveform generator 34 converts the signals it receives into a-c signals and transmits the signals to respective power amplifiers 36 and 38. Following amplification the signals are conducted to respective acoustic projector A 14 and acoustic projector B 16 over submarine cables 40 and 42. While in the present embodiment the signals are handled separately from the pulse controller 32 through to the acoustic projectors 14 and 16, obviously the signals if presented at differing frequencies could be transmitted over a single line with suitable filtering devices at projectors 14 and 16 to select the proper signal.

The acoustic projectors 14 and 16 send acoustic signals through the water medium. Projector A 14 transmits frequencies of 5 kHz for periods of 50 milliseconds. Projector B 16 transmit intermittent pairs of 2.5 kHz signals. Each signal in the pair has a time duration of 30 milliseconds and a lull of 110 milliseconds separates the first and second signal in the pair.

Aboard ship 17 a broadband omnidirectional receiving hydrophone 44 converts the received acoustic signals to electrical signals. These electrical signals are transmitted to a receiver 46 that is pretuned for the frequency of the signals from projectors 14 and 16. The signal from receiver 46 is then transmitted to steering display and recorder 48.

When the ship 17 is underway, the traces made by display and recorder 48 will appear as shown in FIG. 6. The traces 50 and 52 are received from channel B projector 16 and the traces 54 are received from channel A projector 14. The slants of the traces in FIG. 6 show that the ship is approaching the location of the projectors 14 and 16. This gives the effect of subsequent signals being received earlier than if the ship 17 were at zero speed. This gives no problem, however, since it is only the spacing between signals that is important and the effect on these is negligible. The inflection point of this recording indicates the closest point of approach to projectors 14 and 16 thus providing the navigator with a check point on the channel 11. The spacing between the channel B traces remains constant due to the signals being received from the same point. However, should the ship 17 approach the side of the channel where the acoustic projector A 14 is located the time differential on receiving the signals will change. This is shown at location 56 on the traces. When this is observed corrective steering of ship 17 is employed.

The above description is only for one pair of acoustic projectors. In the majority of cases the channel 11 will be of such length that a plurality of pairs of projectors A and B are required, spaced along the length of channel 11.

FIG. 7 shows in block diagram form an arrangement for a plurality of pairs of projectors. Much duplication of components can be avoided. The single electronic clock 30 can be utilized, as can the dual channel pulse controller 32. The waveform generator, however, must send out a plurality of different frequency signals for each pair of projectors to be used. In the above embodiment a plurality of different frequencies must be generated, one for each acoustic projector 14, 14a, 14b, 16, 16a and 16b. Each projector has a respective filter 41, 41a, 41b, 43, 43a or 43b to insure that only the preselected frequency for that particular projector is generated.

Receiving hydrophone 44 and receiver 46 of FIG. 7 are identical with those of FIG. 3. The receiver 46 must be capable of handling all ranges of frequency used. A network 60 has a plurality of filters 62, 62a and 62b for channel A and 64, 64a and 64b for channel B, with each filter conducting only one of the respective frequencies generated and inhibiting the others. Manual switch 66 then selects which pair of signals are to be applied to steering and display recorder 48.

The operation is very similar to FIG. 3 with the only difference being the manual selection of the pair of projector signals closest to the ship at any particular time. Normally the terminals in switch 66 are in sequence for selection as a ship transverses a channel.

Alternative embodiments of the present invention could include various other alignments of the same components shown and/or duplication of components to receive a similar result. For instance individual lines could be run from generator 34 to respective projectors. Another embodiment could include a detector network to select the strongest pair of signals so that manual switching would be obviated.

There has therefore been shown a system enabling a ship to maintain a position in mid-channel utilizing projectors connected to shore based power amplifiers by submarine cables. A different system that could be used would be to have on the vessel a fixed hull mounted projector for transmitting an acoustic signal that is synchronized with the start of a display recorder. When this signal reaches transponders located on opposite sides of the channel, the transponders transmit their own signals. Similarly to the cable connected embodiment of Hydroways, the vessel will then receive the appropriate signal sequence to enable steering in mid-channel. In this system a spacing regulation between vessels would be advantageous along the channel to preclude the activation of the transponders by more than one vessel at a time.

It will be understood that various changes in the details, materials, steps and arrangement of parts, which have been described and illustrated in order to explain the nature of the invention, may be made by those skilled in the art within the principle and scope of the invention as expressed in the appended claims.

What is claimed is:

1. A marine acoustic navigation system comprising:
   timing means for generating a first plurality of electrical signals of predetermined duration and spacing and for generating a second plurality of electrical signals of predetermined duration with members of said second plurality of electrical signals spaced a fixed period of time both before and after each of said first plurality of electrical signals;
   first acoustic projector means connected to said timing means for converting only said first plurality if electrical signals into a first plurality of acoustic signals;
   second acoustic projector means connected to said timing means for converting only said second plurality of electrical signals into a second plurality of acoustic signals;
   receiving means for receiving said first and second plurality of acoustic signals and converting said first and second plurality of acoustic signals into a third plurality of electrical signals; and
   display means connected to said receiving means for receiving said third plurality of electrical signals and displaying them in time sequence.

2. A marine acoustic navigation system according to claim 1 wherein said timing means further comprises:
   a clock for generating a plurality of spaced signals;
   a pulse controller connected to said clock said pulse controller having two channels with each channel counting the spaced signals and inhibiting and conducting predetermined spaced signals; and
   a dual waveform generator connected to each of said two channels and providing a first output of said first plurality of electrical signals and a second output of said second plurality of electric signals.

3. A marine acoustic navigation system comprising:

first means for generating underwater first acoustic signals of predetermined duration at predetermined intervals;

second means for generating underwater second acoustic signals of predetermined duration at predetermined intervals before and after the generation of said first acoustic signals;

receiving means for receiving said first and second acoustic signals and converting said acoustic signals to electrical signals; and display means for receiving said electrical signals and displaying said electrical signals to show the interval in time of arrival at said receiving means of said first and second acoustical signals.

4. A marine acoustic navigation system according to claim 3 wherein said first and second means further comprises:

timing means for generating a first plurality of electrical signals of predetermined duration and spacing and for generating a second plurality of electrical signals of predetermined duration with members of said second plurality of electrical signals spaced a fixed period of time both before and after each of said first plurality of electrical signals;

first acoustic projector means connected to said timing means for converting only said first plurality of electrical signals into said underwater first acoustic signals; and second acoustic projector means connected to said timing means for converting only said second plurality of electrical signals into said underwater second acoustic signals.

5. A marine navigation system according to claim 4 wherein said timing means further comprises:

a clock for generating a plurality spaced signals;

a pulse controller connected to said clock, said pulse controller having two channels with each channel counting the spaced signals and inhibiting and conducting predetermined spaced signals; and a dual waveform generator connected to each of said two channels and providing a first output of said first plurality of electrical signals and a second output of said second plurality of electrical signals.

6. A marine acoustic navigation system comprising:

a plurality of first means having first projectors disposed along one side of a path for generating underwater first acoustic signals, each of said first means generating a respective frequency different from that generated by the other members of said first means, each of said first means generating acoustic signals of predetermined duration at predetermined intervals;

a plurality of second means having second projectors disposed along the other side of said path for generating underwater second acoustic signals, each of said second means generating a respective frequency different from that generated by the other members said first and second means, each of said second means generating acoustic signals of predetermined duration at predetermined intervals before and after the generation of said first acoustic signals;

receiving means for receiving said first and second acoustic signals and converting said acoustic signals to electrical signals;

a plurality of filters with each of said filters conducting the signals of only one of said first and second means and inhibiting the other signals;

switching means connected to receive the signals from said plurality of filters and to conduct a preselected pair of said conducted signals; and display means connected to said receiving means for displaying said preselected pair of said conducted signals.

* * * * *